United States Patent [19]
Bunyan

[11] 3,942,466
[45] Mar. 9, 1976

[54] STERN GEAR OF SHIPS
[75] Inventor: Thomas Walter Bunyan, London, England
[73] Assignee: Pilgrim Engineering Developments Limited, London, England
[22] Filed: Oct. 29, 1974
[21] Appl. No.: 518,637

[30] Foreign Application Priority Data
Oct. 29, 1973 United Kingdom............... 50188/73

[52] U.S. Cl................. 115/34 R; 64/1 R; 285/229; 308/DIG. 12; 308/121; 308/161; 403/291
[51] Int. Cl.² ......................................... B63H 5/06
[58] Field of Search.......... 115/.5 R, 34 R; 403/291, 403/223, 337, 338; 308/DIG. 12, 239, 121, 161; 285/229; 64/1 R, 1 C, 1 V, 12, 19

[56] References Cited
UNITED STATES PATENTS
2,001,167   5/1935   Swennes............................... 64/1 V
3,209,720   10/1965  Campbell et al.................... 115/.5 R
3,470,843   10/1969  Satterthwaite et al............ 115/34 R Primary Examiner—Duane A. Reger
Assistant Examiner—Sherman D. Basinger
Attorney, Agent, or Firm—Woodcock, Washburn, Kurtz & Mackiewicz

[57]   ABSTRACT

A shafting arrangement for a ship comprises a tailshaft supported in bearings in a stern tube which is rigidly mounted in the ship's hull. The tailshaft has a flange which is located in a self-aligning thrust bearing secured to the stern tube. The forward end of the tailshaft is coupled to one end of a tubular intermediate shaft by a first flexible diaphragm coupling which is secured at its periphery to the intermediate shaft and coupled by its hub to the tailshaft. A second flexible diaphragm coupling is secured at its periphery to the other end of the intermediate shaft and coupled by its hub to the output shaft of the propulsion unit or main gearing.

6 Claims, 8 Drawing Figures

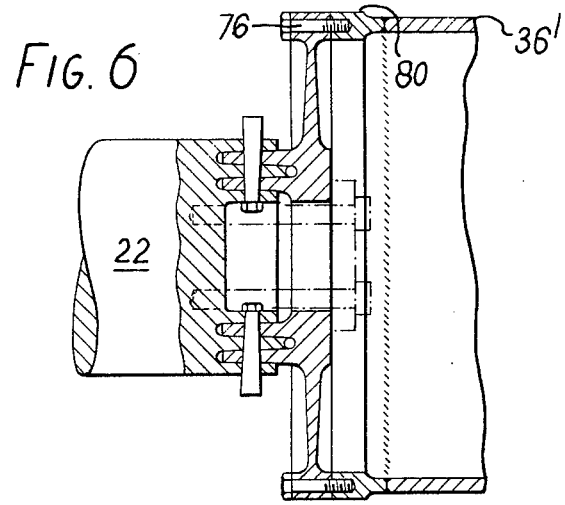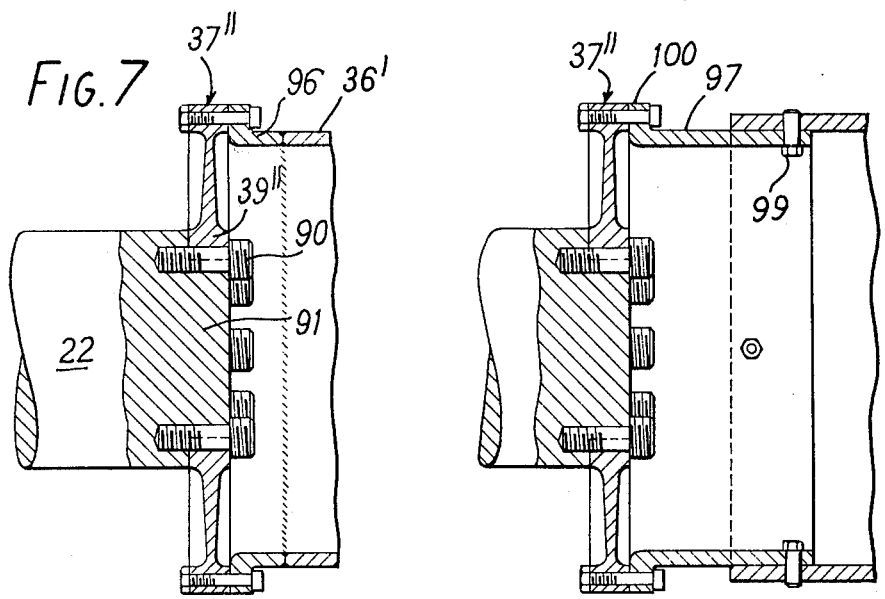

STERN GEAR OF SHIPS

The present invention relates to improvements in the stern gear of ships and in particular in the shafting and bearings.

One of the most serious problems in ships and particularly in very large ships is the difficulties and in extreme cases damage, caused by the static and dynamic flexural movements of the hull foundation known as the tank top. These movements are caused by the very large changes in hydrostatic pressure on the underside of the hull when the draft of the ship changes due to changes in its cargo loading. As the bearings, main gearing and propulsion unit are secured to the tank top, the movements of the hull cause movements in the stern gear such as a change in the attitude of the main gearwheel in relation to second reduction pinion, and the resulting misalignment of gear teeth has caused several failures in very large ships. Measurements made on a 250,000 dwt tanker showed that the turbines and main gearing were lifted 4 millimeters above the line of sight of the shafting when the ship went from light draft to deep draft. As these are normal service drafts: a ship spending part of every round trip in ballast, i.e. light draft, and part fully laden, i.e. in deep draft, the problem is one which must be contained under normal conditions.

The conventional way of dealing with this problem is to reinforce the tank top in the region of the engine room. Reinforcing can only reduce the magnitude of the hull movements keeping them to a value which can just be tolerated by the components of the stern gear. It does not avoid the problem. Indeed the figure of 4 millimeters given above was for a hull which had been considerably stiffened. There is a limit to the amount of stiffening that can be introduced because making the stern of the hull more stiff produces a sudden change in the stiffness of the hull where the stiffened part joins the rest of the hull and increasing the stiffness of the stern part increases the risk of cracking at this point. Furthermore the additional structure required to stiffen the hull foundation is not only expensive to install in terms of material and labour but also takes up valuable space around the shafting making the shafting less accessible.

The object of the present invention is to provide a shafting arrangement which can accommodate the flexural movements of the hull so that the need for stiffening of the hull foundation is avoided.

According to the present invention there is provided a shafting arrangement for a ship comprising a tailshaft supported in bearings in a stern tube rigidly mounted in the ship's hull, the tailshaft having a flange which is located in a self-aligning thrust bearing secured to the stern tube, the forward end of the tailshaft being coupled to one end of a tubular intermediate shaft by a first flexible diaphragm coupling which is secured at its periphery to the intermediate shaft and coupled by its hub to the tailshaft, a second flexible diaphragm coupling being secured at its periphery to the other end of the intermediate shaft and coupled by its hub to the output shaft of the propulsion unit or main gearing.

The flexible diaphragm couplings allow the shafting to accommodate the movements of the hull allowing the tailshaft, intermediate shaft and output shaft of the propulsion unit or main gearing to be inclined relative to one another without causing misalignment in the bearings or gearing or canting of the crankshaft. The self-aligning thrust bearings allow small amounts of canting of the tailshaft without causing uneven loading of the thrust pads in the thrust bearings. Thus the need for stiffening of the hull foundation to prevent flexural movements of the hull is avoided. The present invention also simplifies the installation of the shafting since the safety margins are so large that the problem of obtaining the best compromise in shafting alignment — a difficult and tedious operation in practice, is eliminated. The use of a tubular intermediate shaft enables the weight of the intermediate shaft to be as little as 1/5 the weight of an equivalent solid shaft which means that the weight can easily be carried by the diaphragm couplings. The need for a plummer block bearing and stool is thus avoided.

The thrust bearing transmits the thrust of the propeller to the ships hull through the stern tube, which is an ideal position to apply thrust as the hull is extremely rigid in this region. The thrust bearing may be secured to a flange at the forward end of the stern tube and the stern tube may be built into the after peak floors and longitudinal structural members. The present invention thus avoids the need for a massive thrust stool to transmit the thrust of the propeller to the hull.

Preferably the thrust bearing comprises thrust plates disposed axially on opposite sides of the flange, each thrust plate having an annular recess in which a deformable substantially incompressible ring is located, thrust pads engaging the opposite sides of the flange being carried by two carriers disposed on opposite sides of the flange, the carriers bearing directly or indirectly against the incompressible ring in the annular recess. The deformable substantially incompressible ring preferably consists of a hollow natural or synthetic rubber tyre filled with hydraulic fluid or grease. The deformable incompressible rings allow the thrust pad carriers to adopt an attitude conforming to the attitude of the flange so that all the thrust pads are in engagement with the flange and at the same time transmit the thrust of the flange applied to the carrier rings via the thrust pads, to the thrust plates and thus to the stern tube. Means may be provided for measuring the pressure of the grease in the ring to give a measurement of the thrust so that the thrust bearing operates as a thrust dynamometer.

Embodiments of the invention will now be described, by way of example, with reference to the accompanying drawings in which:

FIGS. 6 to 8 show three modifications of the coupling between the tailshaft and the intermediate shaft.

Figure 1:
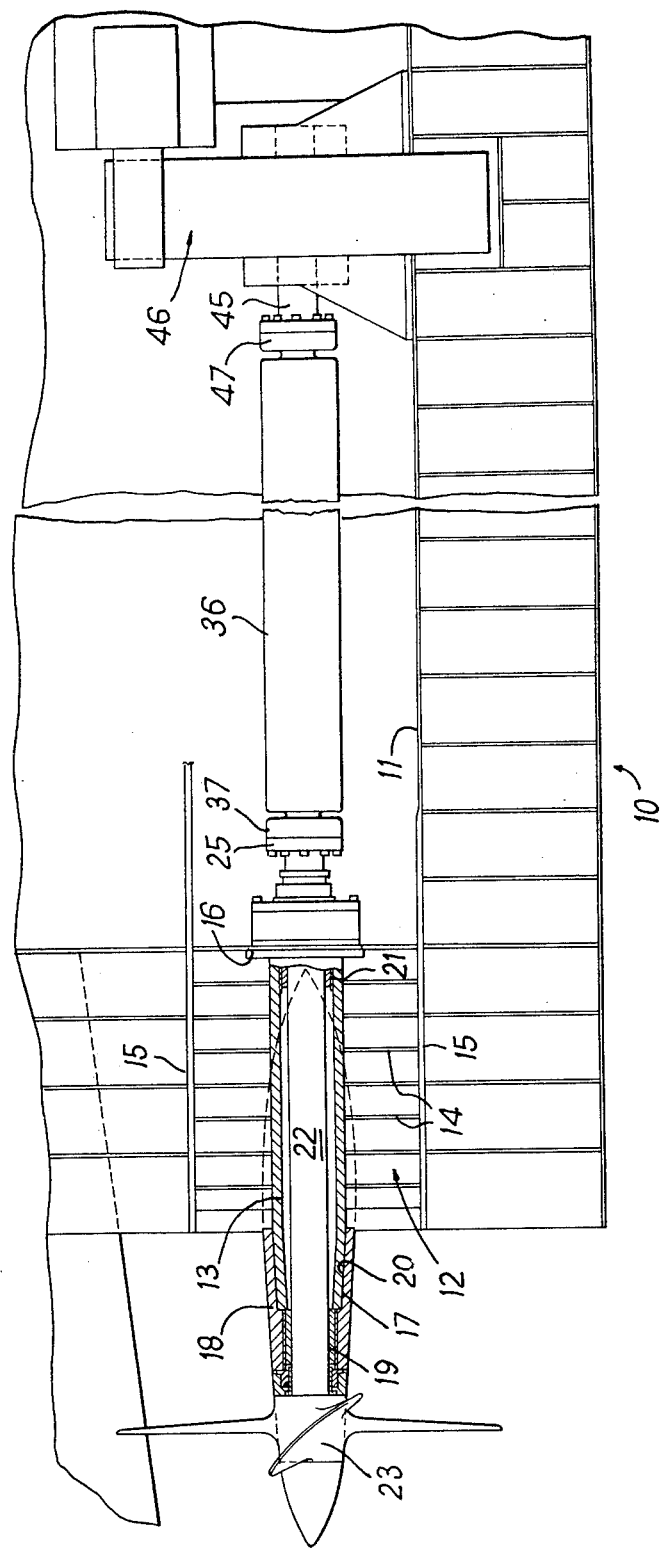
FIG. 1 shows a longitudinal sectional view of the shafting arrangement of a ship.

Referring to FIG. 1, this shows a shafting arrangement of a large tanker, according to the invention. The hull 10 has a foundation or tank top 11. The part 12 of the hull which houses the tailshaft has the shape of a wedge with its sides arranged vertically and forming the sides of the hull, the longitudinal centre line of the ship bisecting the angle of the wedge. At mid-height the wedge shaped part 12 is pierced by a stern tube 13. In the vicinity of the stern tube is a more rigid portion of the wedge, the internal structure or after peak floors 14 of this portion being increased in width to increase the lateral rigidity. Each floor 14 is welded to the stern tube 13. The rigid portion terminates at upper and lower plates or longitudinal members 15 of great thickness. A coupling flange 16 is welded onto the forward end of the stern tube 13. The stern end of the stern tube projects from the wedge and has a tapered outer surface 17. The entire rigid portion is erected as a sub-assembly and the whole structure is stress-relieved before being built into the rest of the ship's structure.

A stern frame boss 18 carries the stern bearings 19 and is mounted on the stern end of the stern tube. The propeller boss has a tapered counterbore 20 which fits onto the tapered surface of the stern tube with a small clearance. The internal surface of the counterbore 20 and the external surface 17 of the stern tube are deeply grooved with a screw thread. When the boss has been located on the stern tube the interface between the counterbore 20 and the tapered surface 17 is filled with a high strength, high friction compound of epoxy resin with carborundum flour. The compound is injected and maintained at a pressure of about 500 psi until set. Forward bearings 21 are mounted at the forward end of the stern tube 13.

A tailshaft 22 is located in the bearings 19 and 21 and has a propeller 23 mounted at its rear end.

The forward end of the tailshaft 22 has an integral thrust collar or flange 24 forged or welded near its forward end and a coupling flange 25 at its forward extremity. The thrust collar or flange 24 is located in thrust bearings 26 which are secured to the flange 16 at the forward end of the stern tube 13. The casing of the thrust bearing is in three parts 27, 28 and 29 which are split castings of spheroidal graphite cast iron. Parts 27 and 29 have their splits on a vertical plane and the part 28 has its split on a horizontal plane. Through bolts 30' secure the parts 27, 28 and 29 together and anchor them firmly to the flange of the stern tube. Alternatively the parts 27 and 29 may be single discs threaded over the end of the tailshaft when it is drawn into the ship.

The parts 27 and 29 constitute thrust plates and are disposed axially on opposite sides of the collar or flange 24. Each thrust plate has an annular recess 30 machined into the face that is adjacent the thrust collar or flange 24. This recess accommodates a flattened annular tube 31 of nitrile rubber. An annular ring 32 is disposed partially in the recess 30 against the tube 31 and supports a conventional thrust bearing carrier plate 33 which is fitted with thrust bearing pads 34. The carrier plates 33 are split diametrically so that by slackening the through bolts 30' and removing the through bolts in the top half, the carrier plates complete with their bearing pads may be removed for inspection, as is the normal practice.

The annular tubes 31 are filled with grease, care being taken to exclude any trapped air. By adjusting the pressure of the grease in the tubes 31, the axial position of the thrust collar may be controlled as well as any pre-loading should this be required. A pressure gauge G may be connected in circuit with the grease in the tyre to give a measurement of the thrust developed by the propeller under service conditions.

A conventional "simplex" oil gland 35 is secured to the forward end of the thrust bearing casing to seal the casing to the tailshaft 22.

On account of the deformable yet incompressible nature of the annular tubes 31, the carrier plates 33 can align themselves with the thrust collar or flange 24 so that all the thrust pads 34 are in contact with the opposite faces of the thrust collar. In this way the thrust bearings 26 are self-aligning and can accommodate small canting movements of the tailshaft in the stern tube.

The flange 25 at the forward end of the tailshaft 22 is secured to an intermediate tubular shaft 36 by means of a coupling 37. The intermediate shaft 36 is formed by rolling a steel plate into a tube and welding a longitudinal joint where the edges of the sheet meet. The flexible diaphragm coupling 37 is turned on a lathe from a steel forging. The diaphragm coupling consists of two diaphragms 38 the thicknesses of which vary with radius so as to achieve uniform shear stress in the material. The diaphragms are joined together by a hub 39, the core of which is bored out at 40 to reduce weight. The peripheries of the diaphragms are radiused where they join respective cylindrical portions 41 and 42. The cylindrical portion 41 is joined to the end of the intermediate shaft 36 by a weld preparation which is first "buttered" with a suitable mild steel electrode before being welded. The cylindrical portion 42 is formed solid with a bolting flange 43. The coupling flange 25 is secured to the bolting flange 43 by means of pre-strained bolts 44 (such as are described in U.K. Pat. No. 1,136,280).

The other end of the intermediate shaft 36 is coupled to the output shaft 45 of the main gear 46 by means of a flexible diaphragm coupling 47. The main gear is driven by a pinion which in turn is driven by the propulsion unit of the ship. The propulsion unit and the housing of the main gear are secured to the tank top 11. The diaphragm coupling 47 is identical in construction with the coupling 37.

Changes in the draft of the ship shown in FIG. 1 cause flexural movements of the hull which cause the position of the main gear to move relative to the line of sight of the tailshaft 22. The shafting arrangement of FIG. 1 can accommodate these movements on account of the flexible couplings 37 and 47. The diaphragms 38 of the flexible coupling 37 and the diaphragm of the flexible coupling 47 allow the tailshaft 22, the intermediate shaft 36 and the output shaft 45 to be out of line whilst rotating.

Figure 3:
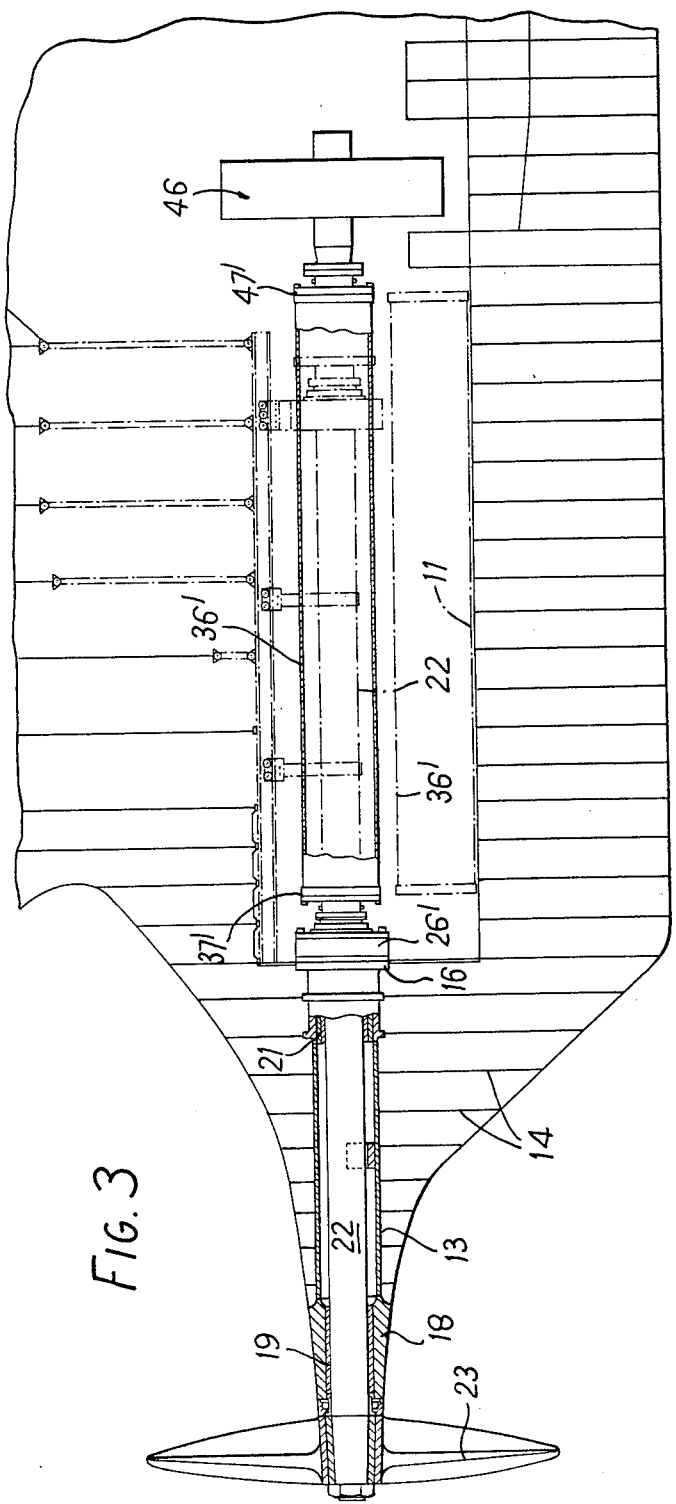
FIG. 3 shows a longitudinal sectional view of the shafting arrangement of another ship.

FIG. 3 shows the shafting arrangement of another ship. Much of the shafting arrangement of FIG. 3 is similar to the arrangement of FIG. 1 and therefore the same reference numerals have been used for similar parts. In the arrangement of FIG. 3 the stern tube 13 has a heavy flange 16 forged at its forward end and is built into the after peak floors 14 and longitudinal structural members in accordance with good modern practice. The stern frame boss which houses the stern bearing is formed as an integral part of the hull 10.

Figure 2:
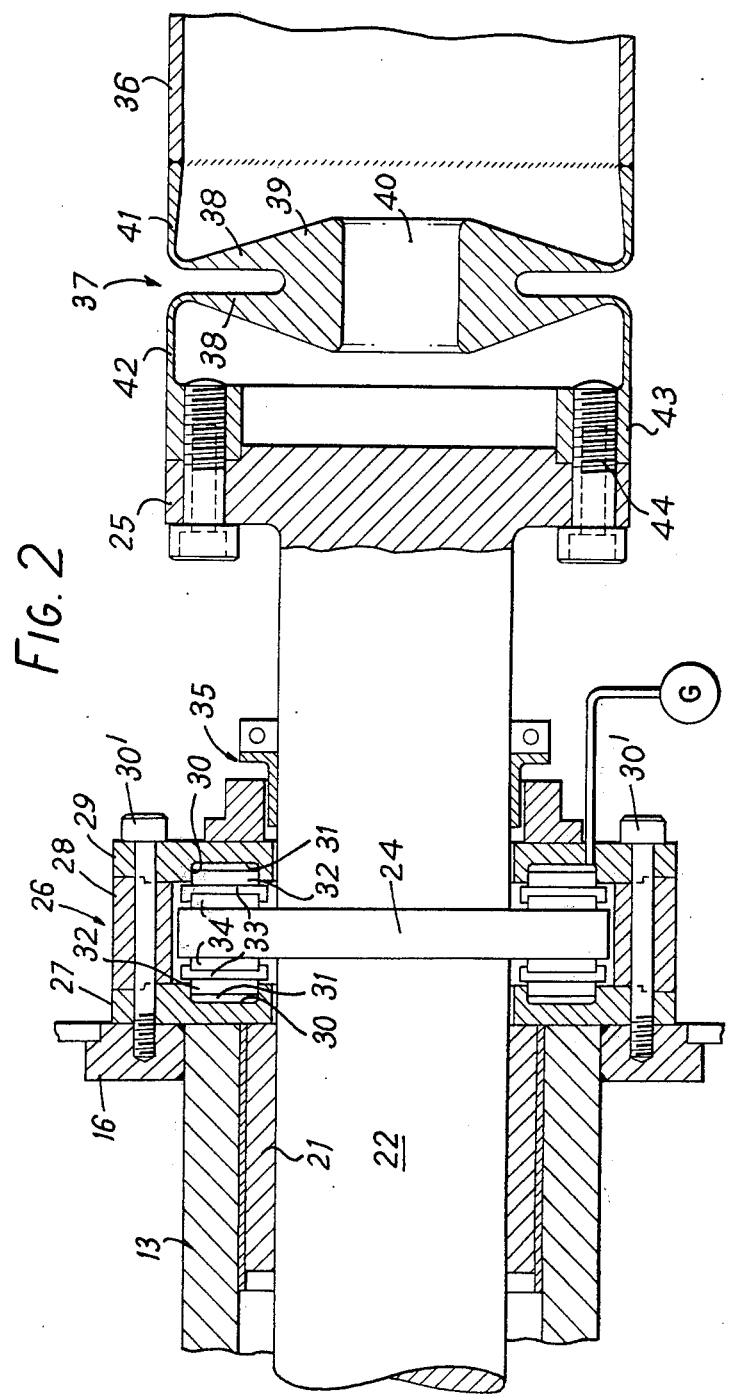
FIG. 2 shows an enlarged longitudinal sectional view of the thrust bearing and diaphragm coupling of the shafting arrangement of FIG. 1.
Figure 4:
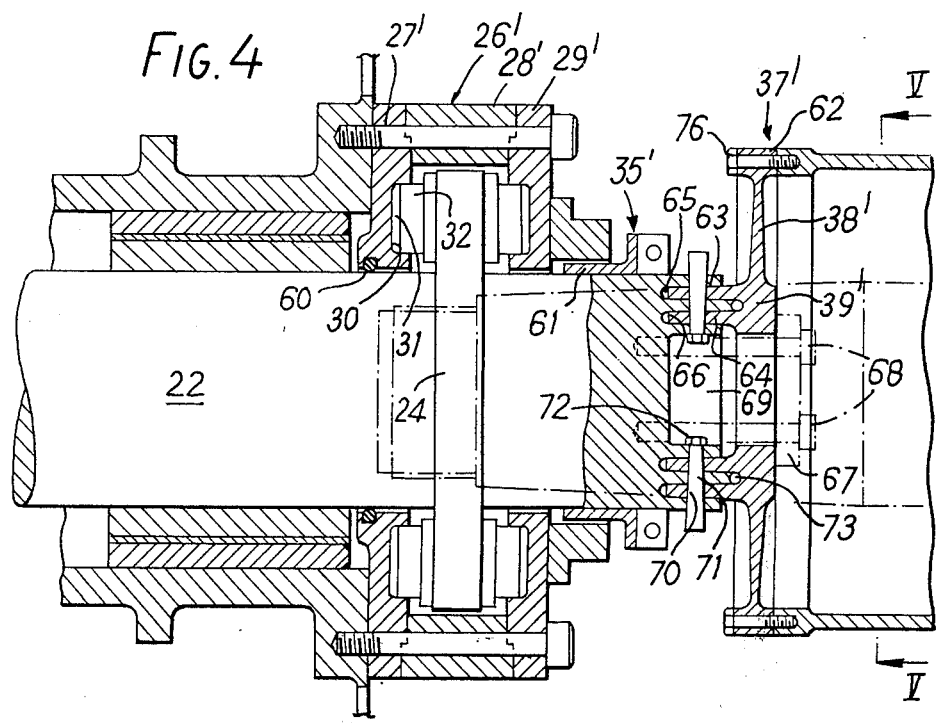
FIG. 4 shows an enlarged longitudinal sectional view of the thrust bearing and diaphragm coupling of the shafting arrangement of FIG. 3.

The forward end of the tailshaft 22 is provided with a thrust collar or flange 24 which may be integrally forged or separately fitted. As shown in FIG. 4 the thrust collar or flange 24 is located in a thrust bearing 26' similar to the thrust bearing 26 of FIG. 2. The thrust plates 27' and 29' are each formed in one piece and may be of cast iron or spheroidal graphite cast iron. Each has an annular recess 30 which receives a flat hollow grease filled nitrile rubber torroidal tube 31 and part of a closely fitting ring piston 32. The ring piston 32 supports a thrust pad carrier ring assembly 33', the thrust pads of which bear against the thrust collar or flange 24. In this embodiment the thrust pad carrier ring assembly 33' is split into three equal parts subtending an angle of 120° for ease of dismantling an assembly. The part 28' constitutes a distance ring and is also of cast iron or spheroidal graphite cast iron. The thrust bearing is secured together and to the flange of the stern tube by several hydraulically tensioned studs which collective provide a uniform tension of not less than 4 times the full load ahead thrust delivered by the propeller. An O-ring seal isolates the lubrication of the thrust bearing 26' from the lubrication of the stern tube bearings 19 and 21 as a precaution against contamination of the thrust bearing lubricating oil should be outboard sea water seal of the stern tube bearings fail in service. Both lubricating oil systems are pressurised by header tanks (not shown) mounted at the same height above the shaft centre line so that there is no difference in pressure against the O-ring seal 60.

The conventional simplex oil gland 35' is fitted at the forward end of the thrust bearing 26'; the simplex sleeve 61 is however 50% longer than the conventional sleeve to provide at least five wearing positions for the labyrinth lips. Each wearing position should give six years service before wearing out so that the sleeve should have a life of 30 years. This means that as the sleeve will not require replacing during the lifetime of the ship the mechanical joint between the diaphragm coupling 37' and the tailshaft 22 which must be broken to replace the sleeve, will not in fact require to be broken in the lifetime of the ship.

Removal of the thrust pads and carrier plates of the carrier plate assembly 33' for inspection is achieved by first shutting off the header tank and draining the oil from the thrust bearings into a drain tank (not shown). The hydraulically tensioned studs are slackened and the studs in either the top half or the bottom half are removed depending on whether carrier plate segments complete with pads are to be lifted out or lowered downwards after removing corresponding top half or bottom half of the part 28'.

In the embodiment of FIGS. 3 and 4 the forward extremity of the tailshaft 22 is not provided with the conventional flange. The diaphragm coupling 37' consists of a single diaphragm 38' which joins the hub 39' to a thickened rim 62. Two concentric rings 63 and 64 extend axially from the hub 39' and taper towards their free ends. Corresponding the tapered recesses 65 and 66 are machined into the forward end face of the tailshaft 22. The flexible coupling 37' is assembled to the tailshaft 22 by force-fitting the tapered concentric rings 63 and 64 into their corresponding recesses 65 and 66. This is achieved by fitting a temporary back-plate 67 over the opposite side of the hub 39' and tightening hydraulically tightened studs 68 which pass through the back-plate into tapped holes in the end of the tailshaft. The tailshaft has a central recess 69 and while so force-fitted a number of radial holes 70 are drilled through the end of the tailshaft and the rings 63 and 64 to the central recess 69. These holes are then tapered by reaming and fitted with matching tapered dowels 71 which are driven into the holes 70 before the force-fitting load produced by the studs 68 is removed. The plate 67 and studs 68 are then dismantled. Nuts 72 are screwed onto screw-threaded end portions of the tapered dowels to retain them in place and the nuts are wired together to lock them.

To dismantle the diaphragm coupling/tailshaft connection, the nuts 72 are removed and the back plate and studs 67 and 68 are assembled and tightened, the hydraulic nuts which tension the studs 68 are pumped up to the original jacking pressure which is about 20,000 psi. The radial dowels are then removed. Before assembly of the diaphragm coupling/tailshaft connection a toroidal tyre 73 is fitted between the annular rings 63 and 64. To dismantle the coupling this tyre is pumped up with hydraulic fluid to a pressure of 20,000 psi through a connector conduit (not shown) in the hub. The hydraulic nuts tensioning the studs 68 are eased off uniformly to ensure that the diaphragm is jacked off the tailshaft uniformly.

In the embodiment of FIGS. 3 and 4 the ends of the intermediate tubular shaft 36' are thickened by either forging or by layering internally and externally by machine welding deposits. The thickened periphery 62 of the diaphragm coupling is secured to the intermediate shaft by through-bolts 76 which are received in tapped holes in the thickened end of the intermediate shaft. The coupling 47' is similar to the coupling 37'.

Figure 5:
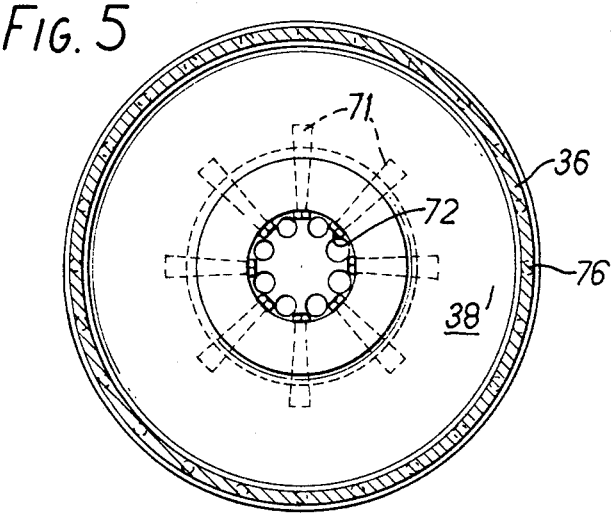
FIG. 5 shows a transverse section on the lines V—V of FIG. 4.

FIG. 6 shows an alternative arrangement for the ends of the intermediate shaft 36'. A separately forged bolting ring 80 is secured to the remainder of the intermediate shaft 36' by machine welding. The diaphragm coupling of FIG. 6 is identical to the diaphragm coupling of FIGS. 4 and 5. The welded joint transmits the full torque of the shaft but because of the large diameter of the hollow shafting the torque is transmitted at low shear stress. As with the arrangement of FIGS. 4 and 5 the diaphragm coupling is secured to the intermediate shaft by bolts 76 which are received in blind holes drilled and tapped in the bolting flange 80. The diaphragm coupling of FIG. 6 is identical with the coupling of FIGS. 4 and 5.

In both the arrangements of FIGS. 4 and 6 the diaphragm coupling and hollow shaft may be bolted together initially by a number of service bolts to have the holes in the periphery of the diaphragm and end of the tubular shaft counterbore and taper reamed progressively to accept parallel bored but correspondingly tapered shear cylinders which are driven into position and permanently held in place by clearance bolts which are finally wired together.

To break this joint every alternate bolt is removed and the holes partially filled with grease. A plunger which is a sliding fit in the holes is driven in by hand hammer causing the shear cylinders to be ejected by grease pressure which is developed in the hole on impact of the hammer on the plunger. The bolts are replaced without their shear cylinders and the process repeated for the remaining bolts.

FIGS. 7 and 8 show an alternative method of coupling the diaphragm coupling to the tailshaft 22. This arrangement is much simpler and cheaper than the arrangement of FIGS. 4 and 6 but the diaphragm is not so flexible. The hub 39" of the diaphragm coupling 37" is coupled to the end of the tailshaft 22 by several self-straining bolts 90. Before assembly the bolts 90 are pre-strained by hydraulic heads not shown (such bolts are described in U.K. Pat. No. 1,136,280). The end of the tailshaft terminates spigot portion 91 of reduced diameter. The bolts 90 are inserted into parallel reamed holes which are half in the spigot portion of the shaft and half in the hub 39". The bolts 90 are nipped up before the straining load is released in diametric pairs simultaneously. The straining heads are then removed. This technique ensures not only an axial tightening load but also a substantial interference fit along the whole length of each bolt. The shear resistance is three times that of an equivalent coupling bolt and a shear stress of only 5 tons per square inch is developed at maximum engine torque.

To dismantle the diaphragm coupling from the tailshaft, the bolts are strained by replacing the hydraulic heads and pumping them up to a pressure of 30,000 psi. Jacking screws (not shown) may be screwed into tapped holes extending axially through the hub to push the hub off against the shoulder between the spigot portion and the rest of the tailshaft.

FIGS. 7 and 8 show two alternative methods of coupling the thickened periphery of the diaphragm coupling 37" to the intermediate shaft. In FIG. 7 a solid forged flange ring 96 is machine welded to the end of the intermediate shaft 36'. In FIG. 8 a flanged ring 97 with an extended skirt is pressed into the end of the intermediate shaft and permanently secured to it by several bolts 98 which are fitted in tapered reamed holes and secured by nuts 99 on spot faced landings. Two rows of bolts are shown with pitches equal but staggered. The flanges in both cases are secured to the periphery of the diaphragm plate by through bolts 100.

The tubular intermediate coupling of all embodiments may be filled with a material such as expanded polystyrene foam to reduce drumming.

Servicing the tailshaft with the shafting arrangement of FIG. 3 is simple. The diaphragm couplings 37' and 47' are unbolted from the intermediate shafting 36 which is then lowered onto the tank top 11 in the position shown in broken line. The propeller is removed from the tailshaft 22 and the tailshaft is then suspended from a conveyor track 110 and drawn into the ship. When the tailshaft 22 is in the position shown in broken line it is easily accessible for inspection and servicing.

I claim:

1. In a ship with a hull, a shafting arrangement comprising: a stern tube rigidly mounted in the ship's hull; bearings in the stern tube; a tailshaft supported in said bearings; a flange on said tailshaft; a self-aligning thrust bearing secured to the stern tube, said flange engaging said self-aligning thrust bearing for transmitting thrust from said tailshaft to said stern tube through said thrust bearing; first and second flexible diaphragm couplings, each coupling having a hub and a periphery; a tubular intermediate shaft; and a drive output shaft, the forward end of the tailshaft being coupled to the stern end of the tubular intermediate shaft by the first flexible diaphragm coupling and the other end of the intermediate shaft being coupled to said drive shaft by said second flexible diaphragm coupling.

2. A shafting arrangement as claimed in claim 1 wherein the said stern tube has a flange at the forward end, the thrust bearing being secured to the said flange.

3. A shafting arrangement as claimed in claim 1 wherein the said hull includes after peak floors and longitudinal structural members; the stern tube being built into the said after peak floors and longitudinal structural members.

4. A shafting arrangement as claimed in claim 1 wherein the thrust bearing comprises thrust plates disposed axially on opposite sides of said flange, each thrust plate having an annular recess in which a deformable substantially incompressible ring is located, thrust pads engaging the opposite sides of the flange and two carriers disposed on opposite sides of the flange which carriers carry the thrust pads, the carriers bearing against the incompressible ring in the annular recess.

5. A shafting arrangement as claimed in claim 4 wherein the deformable substantially incompressible ring consists of a hollow natural or synthetic rubber tyre filled with hydraulic fluid or grease.

6. A shaft arrangement as claimed in claim 5 wherein means are provided for measuring the pressure of the grease in the ring to give a measurement of the thrust.

* * * * *